United States Patent
Nakashima et al.

(10) Patent No.: US 8,406,635 B2
(45) Date of Patent: Mar. 26, 2013

(54) OPTICAL COMMUNICATION SYSTEM AND OPTICAL RECEIVER

(75) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 12/619,656

(22) Filed: Nov. 16, 2009

(65) Prior Publication Data
US 2010/0189445 A1  Jul. 29, 2010

(30) Foreign Application Priority Data
Jan. 29, 2009  (JP) ................................ 2009-018840

(51) Int. Cl.
*H04B 10/00* (2006.01)
(52) U.S. Cl. ........ 398/158; 398/159; 398/152; 398/202; 398/204; 398/205; 398/206; 398/207; 398/208; 398/209; 398/33; 375/316; 375/341; 375/348
(58) Field of Classification Search .................. 398/202, 398/203, 204, 205, 206, 207, 208, 209, 152, 398/65, 158, 159, 210, 211, 212, 213, 214, 398/183, 184, 154, 155, 135, 136, 137, 138, 398/139, 33, 38, 177, 181, 30, 31; 375/316, 375/341, 348, 350, 343
See application file for complete search history.

(56) References Cited

U.S. PATENT DOCUMENTS

| | | | |
|---|---|---|---|
| 5,390,185 A | 2/1995 | Hooijmans et al. | |
| 7,542,678 B2 | 6/2009 | Raddatz | |
| 8,081,885 B2 * | 12/2011 | Jansen et al. | 398/203 |
| 2007/0092260 A1 * | 4/2007 | Bontu et al. | 398/152 |
| 2008/0205905 A1 | 8/2008 | Tao et al. | |
| 2010/0074632 A1 * | 3/2010 | Zhou | 398/208 |

FOREIGN PATENT DOCUMENTS

| | | |
|---|---|---|
| EP | 1 630 982 | 3/2006 |
| JP | 5-292033 A | 11/1993 |
| JP | 07-046224 | 2/1995 |
| JP | 11-041207 | 2/1999 |
| JP | 2008-211801 | 9/2008 |

OTHER PUBLICATIONS

"The extended European search report" mailed by EPO and corresponding to European Patent application No. 09 174 449.0 on May 31, 2010.
Pfau, T et al., "PDL-Tolerant Real-time Polarization-Multiplexed QPSK Transmission with Digital Coherent Polarization Diversity Receiver", Leos Summer Topical Meetings, 2007 Digist of the IEEEXP031125301 ISBN:9781424409266, Jul. 1, 2007, pp. 17-18.
D., McGhan "Electronic Dispersion Compensation", *OFC 2006* 2006, 1-30.

(Continued)

*Primary Examiner* — Hanh Phan
(74) *Attorney, Agent, or Firm* — Fujitsu Patent Center

(57) ABSTRACT

An optical receiver for receiving an optical signal that transmits a first data signal and a second data signal, including: an optical front-end configured to generate a digital signal that represents the optical signal; a detector configured to detect a state of the optical signal by using the digital signal and output state information that represents the state of the optical signal; a state controller configured to control the digital signal on the basis of the state information in order to recover the first data signal; and a data recovery configured to recover the second data signal on the basis of the state information.

11 Claims, 16 Drawing Sheets

OTHER PUBLICATIONS

Dany-Sebastien, Ly-Gagnon et al.,"Coherent Detection of Optical Quadrature Phase-Shift Keying Signals With Carrier Phase Estimation",*IEEE Journal of Lightwave Technology*, vol. 24, No. 1 Jan. 2006, 12-21.

Japanese Office Action mailed Nov. 13, 2012 for corresponding Japanese Application No. 2009-018840, with English-language translation.

* cited by examiner

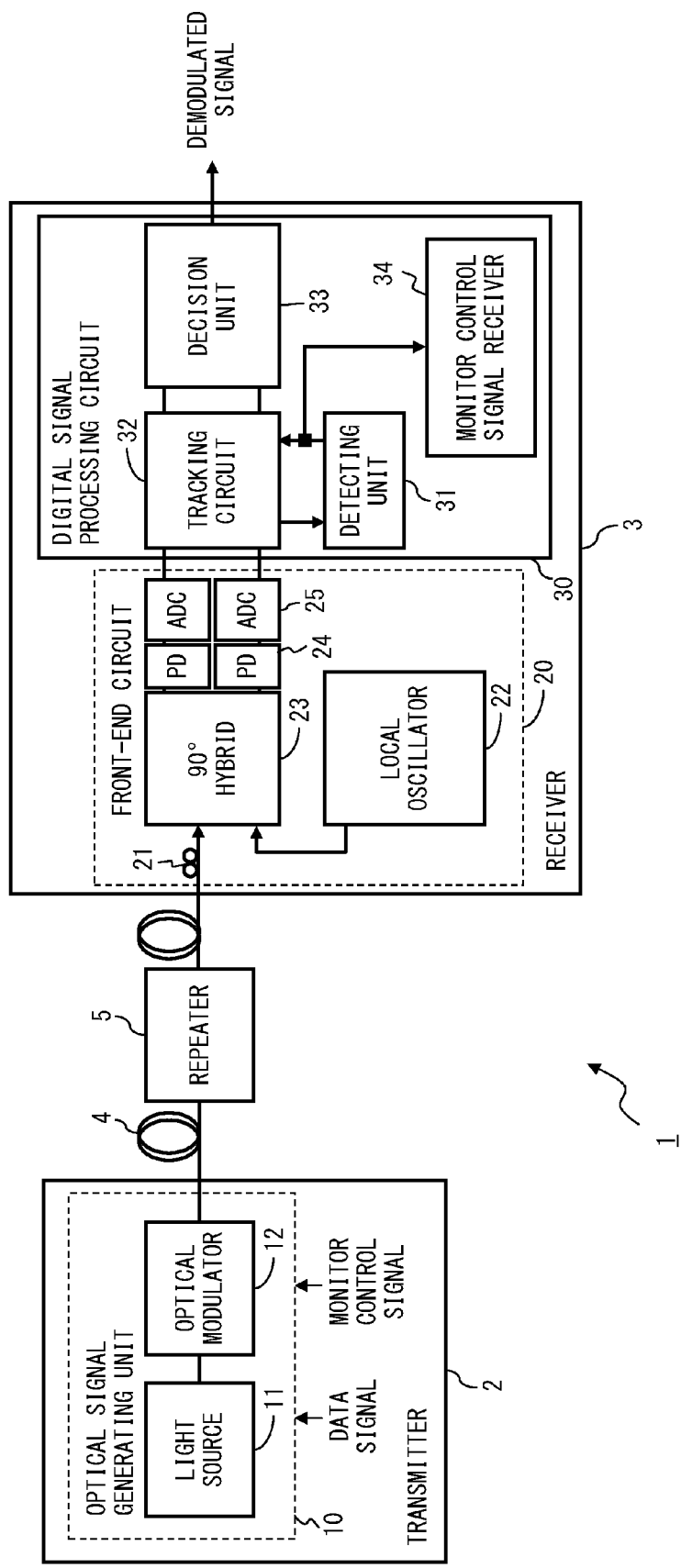
F I G. 1

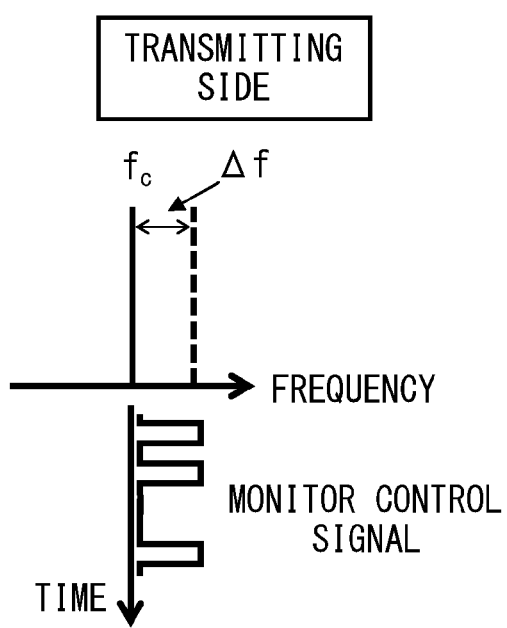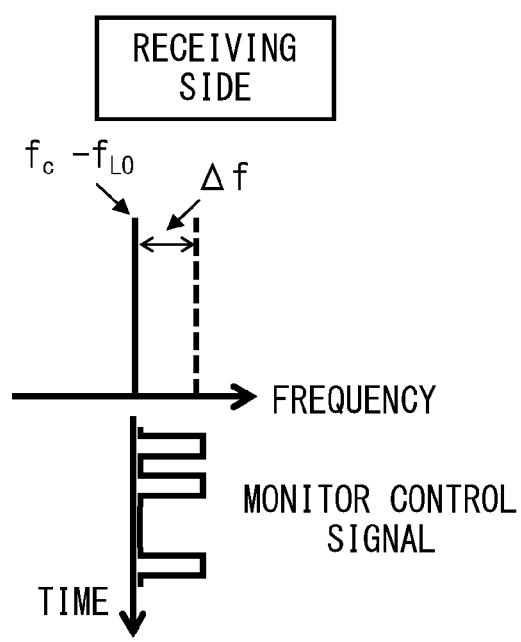
F I G. 3A  F I G. 3B

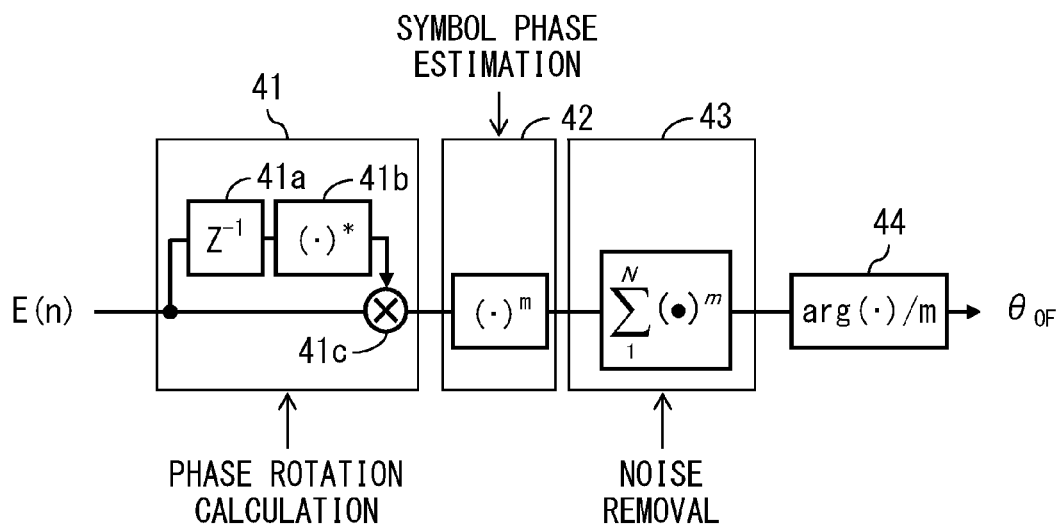
F I G. 4 A

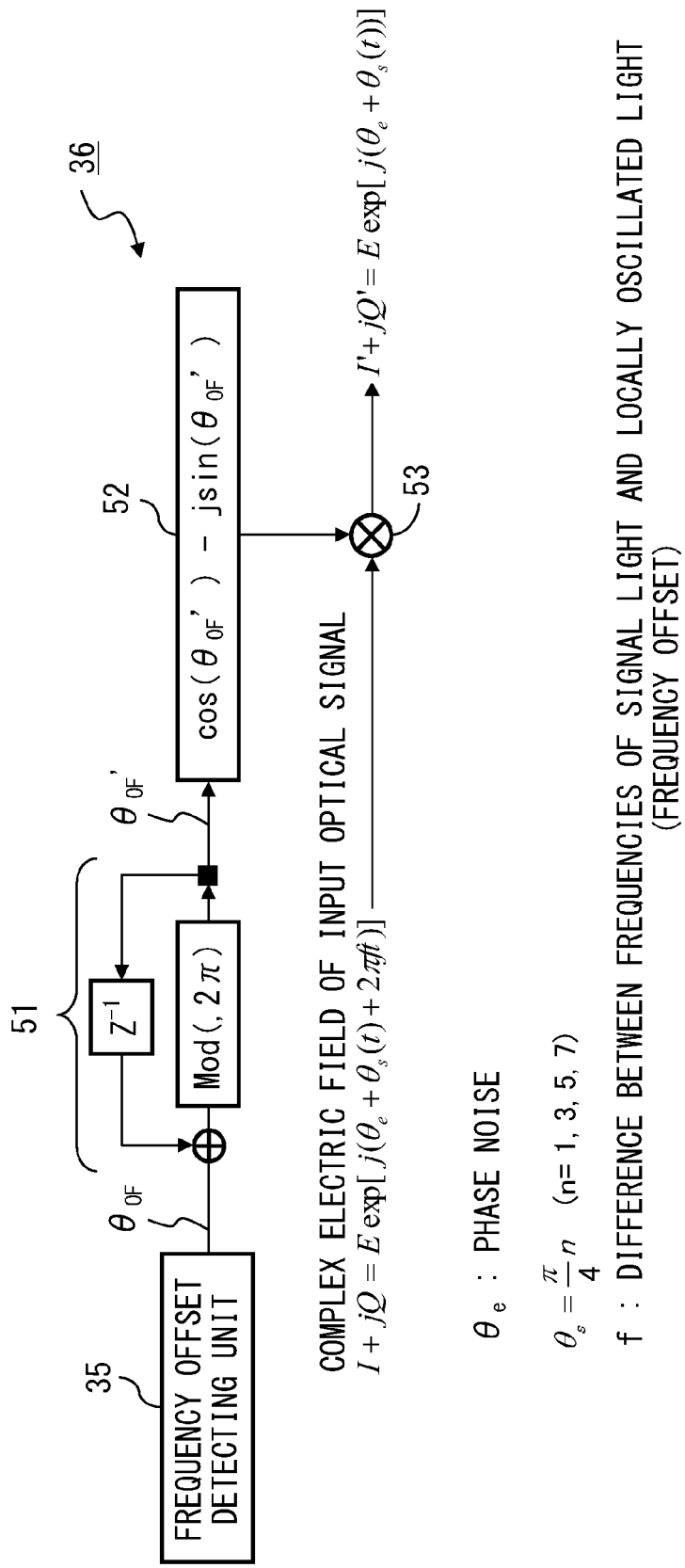
F I G. 5

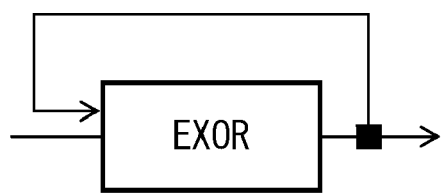
F I G. 6 A
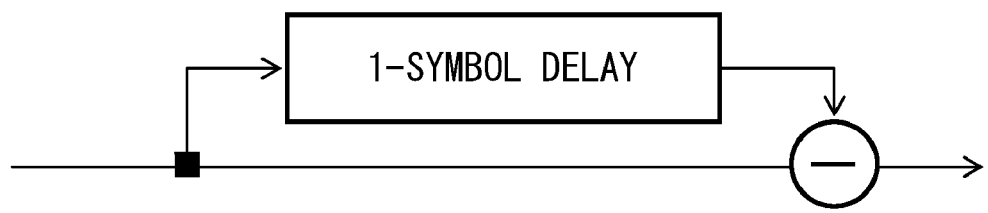
F I G. 6 B

OPTICAL COMMUNICATION SYSTEM AND OPTICAL RECEIVER

CROSS-REFERENCE TO RELATED APPLICATIONS

This application is based upon and claims the benefit of priority of the prior Japanese Patent Application No. 2009-018840, filed on Jan. 29, 2009, the entire contents of which are incorporated herein by reference.

FIELD

The present invention relates to a digital coherent optical receiver, and an optical communication system including the digital coherent optical receiver.

BACKGROUND

With the popularization of the Internet, the capacity of optical communication systems has been increasingly growing. By way of example, for a trunk line system, an optical transmitter and an optical receiver which can respectively transmit and receive a signal exceeding 40 Gbit/s per wavelength are currently under study.

If the bit rate per wavelength is increased, signal quality is significantly degraded by a decrease in an optical signal-to-noise ratio (OSNR) tolerance and any waveform distortion caused by the chromatic dispersion of a transmission line, polarization mode dispersion, nonlinear effects, etc. Accordingly, attention has been focusing on a digital coherent reception system with high OSNR tolerance and waveform distortion tolerance in recent years.

In the digital coherent reception system, optical intensity information and phase information are extracted from a received signal, which is then demodulated by a digital signal processing circuit. Also in the digital coherent reception system, an OSNR tolerance is improved with coherent reception, and a waveform distortion is compensated by the digital signal processing circuit. Therefore, high reliability can be achieved even in an optical communication system exceeding 40 Gbit/s. A technique for receiving QPSK optical signal with coherent detection is recited, for example, in D. Ly-Gagnon et al, "Coherent Detection of Optical Quadrature Phase-Shift Keying Signals With Carrier Phase Estimation", IEEE Journal of Lightwave Technology, vol. 24, No. 1, pp 12-21, January 2006.

Additionally, a configuration for transmitting specific information that is different from a data signal between a transmitter and a receiver in an optical communication system is known. For example, monitor information or control information is transmitted between the transmitter and the receiver, whereby improvements in a transmission characteristic, the establishment of a flexible network, and cost reductions in communication appliances can be expected.

In the transmission system of a related art, a transmitter includes an output control unit for adjusting a output signal level. The output control unit controls the output signal level of each channel according to feedback information from a receiver so that the optical intensity of each channel in the receiver attains a certain level. The configuration of the related art is described, for example, in Japanese Laid-open Patent Publication No. 05-292033.

In the transmission system of another related art, a receiver estimates the chromatic dispersion of a transmission line by monitoring a bit error rate, and feeds back the estimation result to a transmitter. The transmitter has a function (pre-distortion function) to add, to a transmission signal, a waveform distortion for compensating for the chromatic dispersion of the transmission line on the basis of a notification made from the receiver. The configuration of the other related art is described, for example, in D. McGhan, "Electronic Dispersion Compensation", OFC 2006, OWK1, 2006.

As described above, the method by which a control signal is transmitted between a transmitter and a receiver in addition to a data signal in an optical communication system adopting coherent reception has been proposed. With the conventional technology, however, a control signal is generally recovered by using a dedicated circuit in the receiver. Therefore, the circuitry scale of the receiver increases. Otherwise, the use efficiency of wavelength resources is low in a configuration for allocating a dedicated wavelength to a control signal. This problem is not limited to a system that transmits a control signal, and may possibly occur in a system that transmits information items different from a data signal.

SUMMARY

According to an aspect of the invention, an optical communication system for transmitting an optical signal via an optical transmission line, including: an optical signal generator configured to generate an optical signal that transmits a first data signal and a second data signal in a transmitter; an optical front-end configured to generate a digital signal that represents the optical signal in a receiver; a detector configured to detect a state of the optical signal by using the digital signal and output state information that represents the state of the optical signal in the receiver; a state controller configured to control the digital signal on the basis of the state information in order to recover the first data signal in the receiver; and a data recovery configured to recover the second data signal on the basis of the state information in the receiver.

According to another aspect of the invention, an optical receiver for receiving an optical signal that transmits a first data signal and a second data signal, including: an optical front-end configured to generate a digital signal that represents the optical signal; a detector configured to detect a state of the optical signal by using the digital signal and output state information that represents the state of the optical signal; a state controller configured to control the digital signal on the basis of the state information in order to recover the first data signal; and a data recovery configured to recover the second data signal on the basis of the state information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of an optical communication system according to embodiments;

FIGS. 3A and 3B illustrate relationships between a monitor control signal and a carrier frequency;

FIGS. 4A and 4B respectively illustrate an implementation example of a frequency offset detecting unit;

FIG. 5 illustrates an implementation example of a frequency offset compensating unit;

FIG. 6A illustrates an implementation example of a differential precoding circuit;

FIG. 6B illustrates an implementation example of a differential decoding circuit;

DESCRIPTION OF EMBODIMENTS

Figure 2:
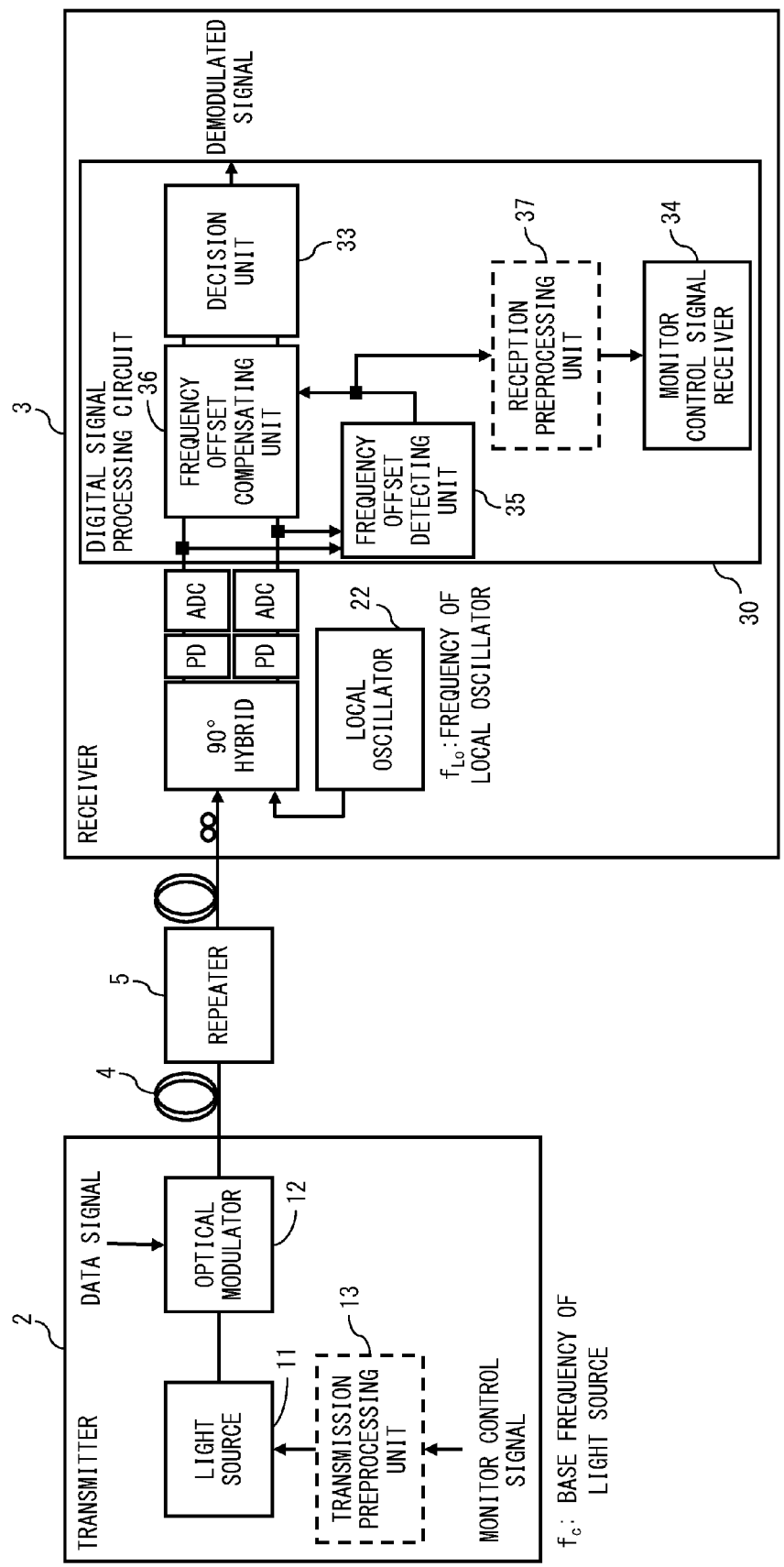
FIG. 2 illustrates a configuration of an optical communication system according to a first embodiment.

FIG. 1 illustrates a configuration of an optical communication system according to embodiments. In the optical communication system according to the embodiments, an optical signal is transmitted from a transmitter 2 to a receiver 3 via an optical transmission line 4, on which one or a plurality of repeaters 5 are provided depending on need. Each repeater 5 includes an optical amplifier for amplifying the optical signal. Moreover, each repeater 5 may have a function to shape the waveform of the optical signal, a function to compensate for dispersion, and the like, depending on need.

The transmitter 2 includes an optical signal generating unit 10. The optical signal generating unit 10 includes a light source 11 and an optical modulator 12. The light source 11 includes, for example, a laser oscillator, and generates signal light of a certain frequency band (such as a C band, L band, etc.). The signal light generated by the light source 11 is continuous wave light in the embodiments. The optical signal generating unit 10 adopts an external modulation method in an implementation example. However, a direct modulation method may be adopted.

The optical modulator 12 modulates the signal light in accordance with a data signal. A modulation method is, for example, PSK, QAM, etc., although the method is not particularly limited. The data rate of the data signal is, for example, several Gbit/s to several tens of Gbit/s, although the data rate is not particularly limited.

The optical signal generating unit 10 superimposes a monitor control signal on the data signal. In this embodiment, the optical signal generating unit 10 superimposes the monitor control signal, for example, by using the carrier frequency, the carrier phase, the polarization state, etc. of a carrier wave. The symbol rate of the monitor control signal is sufficiently lower than the data signal. The symbol rate is, for example, several kbit/s to several Mbit/s.

A method for superimposing the monitor control signal on the data signal is not particularly limited. Namely, the monitor control signal may be superimposed after the modulation in accordance with the data signal, or the modulation in accordance with the data signal is performed after the monitor control signal is superimposed. Alternatively, the optical signal generating unit 10 may modulate the signal light with a mixed signal obtained by mixing the data signal and the monitor control signal. The monitor control signal transmits, for example, information for controlling an operation of the optical communication system 1. However, information transmitted by the monitor control signal is not limited to this. Namely, the signal superimposed on the data signal may transmit various items of auxiliary information or additional information.

As described above, the transmitter 2 generates and transmits the optical signal that carries the data signal and the monitor control signal. This optical signal is transmitted to the receiver 3 via the optical transmission line 4.

The receiver 3 includes a front-end circuit 20 and a digital signal processing circuit 30. The front-end circuit 20 includes a polarization controller 21, a local oscillator 22, a 90° hybrid circuit 23, one pair of photodetectors 24, and one pair of A/D converters 25. The polarization controller 21 controls the polarization of the optical signal received via the optical transmission line 4. The local oscillator 22 is a laser oscillator, and generates locally oscillated light of same or almost the same frequency as the carrier frequency of the optical signal (or the oscillation frequency of the light source 11 included in the transmitter 2). The 90° hybrid circuit 23 generates one pair of optical signals by using the input optical signal and the locally oscillated light. One of the optical signals is obtained by mixing the locally oscillated light and the input optical signal, whereas the other optical signal is obtained by mixing the locally oscillated light, the optical phase of which is shifted by 90°, and the input optical signal. The one pair of photodetectors 24 converts the one pair of optical signals output from the 90° hybrid circuit 23 into one pair of electric signals. The one pair of A/D converters 25 converts the one pair of electric signals into a digital signal. The digital signal represents the I-component and the Q-component of the input optical signal of the receiver 3.

As described above, the front-end circuit 20 generates the digital signal that represents the input optical signal. This digital signal is processed by the digital signal processing circuit 30.

The digital signal processing circuit 30 includes a detecting unit 31, a tracking circuit 32, a decision unit 33, and a monitor control signal receiver 34. The digital signal processing circuit 30 is, for example, a DSP. However, the digital signal processing circuit 30 may be implemented with a general processor.

The detecting unit 31 detects the state of the optical signal by using the digital signal that represents the input optical signal, and outputs state information representing the state of the signal. The state information is used in an adaptive control to adaptively demodulate the optical signal. Moreover, the state information is, for example, information about the carrier frequency of the optical signal, information about the carrier phase of the optical signal, or information about the polarization state of the optical signal. This state information is provided to the tracking circuit 32 and the monitor control signal receiver 34.

The tracking circuit 32 adaptively tracks fluctuations in the state of the input optical signal by using the state information. Namely, the digital signal that represents the state of the optical signal is controlled in accordance with the state information. As a result, the digital signal that represents the optical signal, the frequency offset and/or the phase error of which are compensated for, is obtained. Alternatively, the digital signal that represents the optical signal, the polarization of which is suitably tracked, may be obtained. The decision unit 33 decides each symbol of the digital signal output from the tracking circuit 32. As a result, a demodulated signal is obtained. Namely, the data signal is recovered.

The monitor control signal receiver 34 recovers the monitor control signal by using the state information generated by the detecting unit 31. Namely, the monitor control signal receiver 34 recovers the monitor control signal by using the state information for tracking the input optical signal. Operations of the monitor control signal receiver 34 will be described in detail later.

As described above, the receiver 3 recovers the monitor control signal by using the state information generated to demodulate the input optical signal. In other words, the detecting unit 31 is used not only to recover the data signal but also to recover the monitor control signal. Accordingly, the amount of digital signal processing executed by the receiver 3 is reduced.

First Embodiment

FIG. 2 illustrates a configuration of an optical communication system according to a first embodiment. In the first embodiment, the monitor control signal is transmitted by using the carrier frequency of an optical signal. The monitor control signal is digital data in this embodiment.

In FIG. 2, the oscillation frequency of the light source 11 changes in accordance with a driving condition (such as an applied voltage, a temperature, etc.). Accordingly, by providing the driving condition corresponding to the monitor control signal to the light source 11, the oscillation frequency of the light source 11 is controlled by the monitor control signal. Namely, the carrier frequency of the optical signal changes in accordance with the monitor control signal. The base frequency of the light source 11 is $f_C$, as illustrated in FIG. 3A. In this embodiment, the oscillation frequency of the light source 11 is $f_C$ if the monitor control signal is "0", or the oscillator frequency is $f_C+\Delta f$ if the monitor control signal is "1". The optical modulator 12 modulates the signal light output from the light source 11 in accordance with the data signal. As a result, the monitor control signal is superimposed on the data signal, and the optical signal that transmits the data signal and the monitor control signal is generated.

The receiver 3 receives and demodulates the optical signal transmitted from the transmitter 2. The receiver 3 includes the front-end circuit 20 and the digital signal processing circuit 30 as described above. The front-end circuit 20 includes the local oscillator 22, and detects an optical signal.

The oscillation frequency of the local oscillator 22 is $f_{LO}$. Generally, the carrier frequency (base frequency) $f_C$ and the frequency $f_{LO}$ of the locally oscillated light generated by the local oscillator 22 are slightly different from each other. The difference between the two frequencies $f_C$ and $f_{LO}$ is hereinafter referred to as a "frequency offset ($f_{OF}$)". At this time, if an optical signal is detected by using the locally oscillated light, the digital signal that represents the optical signal includes the influence of the frequency offset. Accordingly, the digital signal processing circuit 30 detects and compensates for the frequency offset.

The digital signal processing circuit 30 includes the decision unit 33, the monitor control signal receiver 34, a frequency offset detecting unit 35, and a frequency offset compensating unit 36. The frequency offset detecting unit 35 and the frequency offset compensating unit 36 respectively correspond to the detecting unit 31 and the tracking circuit 32, which are illustrated in FIG. 1.

The frequency offset detecting unit 35 detects the frequency offset on the basis of the digital signal that represents the input optical signal. Although a method for detecting a frequency offset is not particularly limited, the frequency offset is calculated, for example, by a computing circuit illustrated in FIG. 4A or 4B.

The frequency offset detecting unit 35 illustrated in FIG. 4A includes a phase rotation calculating unit 41, a multiplying unit 42, a total sum computing unit 43, and an argument calculating unit 44. The frequency offset detecting unit 35 calculates the frequency offset with an Mth power method. An input signal E(n) is a complex digital signal (I+jQ) obtained by the front-end circuit 20, and represents an optical signal that transmits an nth symbol. "m" corresponds to a modulation method. "m" is, for example, "4" in QPSK, and "16" in 16PSK.

The phase rotation calculating unit 41 includes a delay element 41a, a complex conjugate computing unit 41b, and a multiplier 41c. The delay element 41a delays the input signal by the time period of one symbol. The complex conjugate computing unit 41b calculates the complex conjugate of the delayed signal. The multiplier 41c multiplies the input signal by the complex conjugate. As a result, a difference between the optical phase of the nth symbol and that of the (n+1)th symbol is calculated. Namely, the amount of phase rotation per the time period of one symbol is calculated.

The multiplying unit 42 raises the output value of the phase rotation calculating unit 41 to the m-th power. The total sum computing unit 43 calculates the total sum of N sets of the output values of the multiplying unit 42. Namely, an average value of N symbols is calculated. N is not particularly limited. By averaging the N symbols, a noise component is removed.

The argument calculating unit 44 calculates the argument of a complex number output from the total sum computing unit 43, and divides the argument by "m". The argument $\theta_{ARG}$ of a complex number X+jY is obtained with the equation $$\text{Argument } \theta_{ARG} = \tan^{-1}(Y/X)$$

With the above computation, a phase $\theta_{OF}$ corresponding to the frequency offset is obtained. The configuration and the operations illustrated in FIG. 4A are a known technique, and recited, for example, in A. Leven et al., PTL. Vol. 19 (2007), 366-368.

Figure 4B:
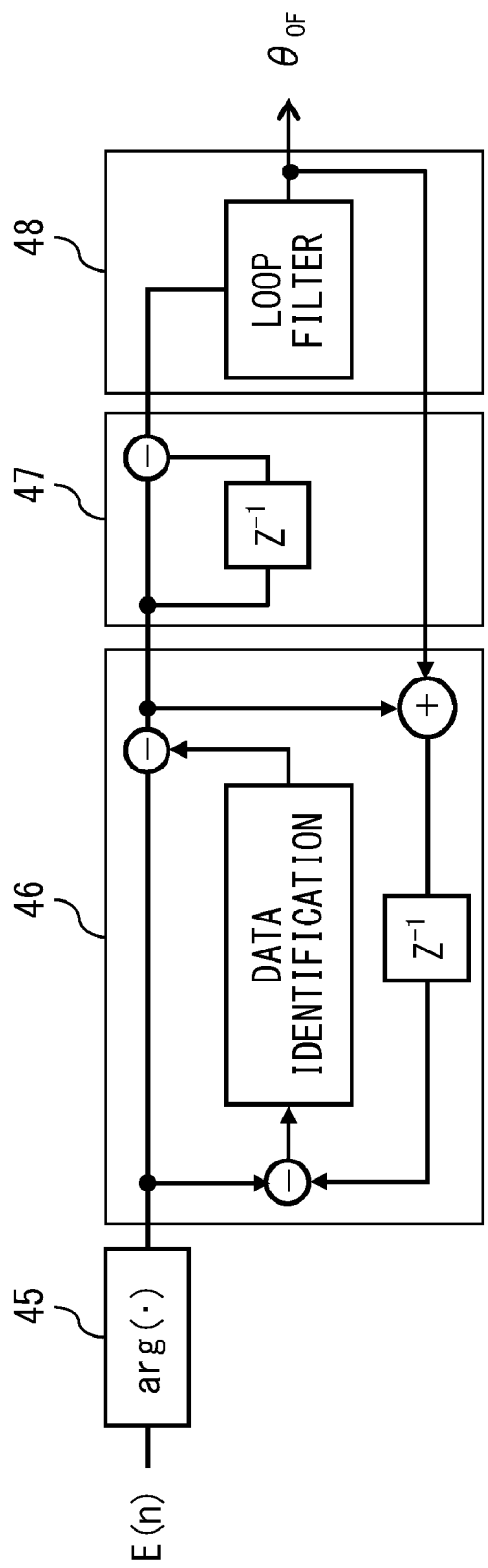

The frequency offset detecting unit 35 illustrated in FIG. 4B includes an argument calculating unit 45, a symbol phase estimating unit 46, a phase rotation calculating unit 47 and an averaging unit 48. The argument calculating unit 45 calculates the argument $\theta_{ARG}$ of an optical signal for each symbol on the basis of the digital signal that represents the input optical signal. The symbol phase estimating unit 46 estimates a symbol phase $\theta_S$, and outputs a difference between the argument $\theta_{ARG}$ and the symbol phase $\theta_S$. The estimated symbol phase $\theta_S$ is, for example, $\pi/4$, $3\pi/4$, $5\pi/4$, or $7\pi/4$ in QPSK. The phase rotation calculating unit 47 includes delay element and calculates the amount of change between symbols in the output value of the symbol phase estimating unit 46. As a result, the amount of phase rotation per the time period of one symbol is calculated. The averaging unit 48 includes a loop filter. The averaging unit 48 averages and outputs the output value of the phase rotation calculating unit 47. With the above described computation, a phase $\theta_{OF}$ corresponding to the frequency offset is obtained. The output value of the averaging unit 48 is added to the output value of the symbol phase estimating unit 46, and the addition result is delayed by the time period of one symbol. The symbol phase estimating unit 46 estimates the symbol phase $\theta_S$ on the basis of a difference between the argument $\theta_{ARG}$ and the delayed addition result. The configuration and the operations illustrated in FIG. 4B are a known technique, and recited, for example, in L. Li et al., OFC/NFOEC 2008, OWT4 (2008).

As described above, the frequency offset detecting unit 35 detects the frequency offset $f_{OF}$ on the basis of the digital signal that represents the input optical signal. Here, the frequency offset $f_{OF}$ is a difference between the carrier frequency (base frequency) and the frequency of locally oscillated light. However, the frequency offset detecting unit 35 in this embodiment calculates the phase $\theta_{OF}$ corresponding to the frequency offset (the amount of phase change caused by the frequency offset during the time period of one symbol). The calculated phase $\theta_{OF}$ is provided to the frequency offset compensating unit 36 and the monitor control signal receiver 34.

FIG. 5 is an implementation example of the frequency offset compensating unit 36. To the frequency offset compensating unit 36, the digital signal that represents the input optical signal and the phase $\theta_{OF}$ corresponding to the frequency offset are provided. This digital signal represents the complex electric field of the input optical signal.

The frequency offset compensating unit 36 includes an integration circuit 51, a compensation value calculating unit 52 and a multiplier 53. The integration circuit 51 includes a delay element and an adder. The integration circuit 51 accumulatively adds the phase $\theta_{OF}$ generated for each symbol to generate "$\theta_{OF}'$". However, the integration circuit 51 includes a $2\pi$ Modulo calculator, and subtracts $2\pi$ from an added value if the added value of the phase $\theta_{OF}$ exceeds $2\pi$. The compensation value calculating unit 52 calculates "$\cos(\theta_{OF}')-j\sin(\theta_{OF}')$" by using a phase $\theta_{OF}'$ obtained by the integration circuit 51. Namely, a compensation value "$\exp(-\theta_{OF}')$" is calculated.

The multiplier 53 multiplies the digital signal that represents the input optical signal by the compensation value. Here, the complex electric field of the input optical signal is represented by the following equation.

complex electric field $$(I+jQ)=E\exp[j(\theta_e+\theta_S(t)+2\pi f_{OF}t)]$$

where $f_{OF}$ is the frequency offset. Accordingly, "$2\pi f_{OF}t$" is removed by the computation performed by the multiplier 53. Namely, the frequency offset $f_{OF}$ is compensated for. The phase noise $\theta_e$ slowly changes with respect to the symbol time. Accordingly, the phase noise $\theta_e$ is removed, for example, by a difference computation performed between symbols in FIG. 4A or 4B.

As described above, the frequency offset is compensated for and the phase information $\theta_S$ corresponding to the data signal is obtained in the frequency offset compensating unit 36. The phase information $\theta_S$ is provided to the decision unit 33 illustrated in FIG. 2. The decision unit 33 decides the data signal on the basis of the phase information $\theta_S$. As a result, a demodulated signal is obtained. Namely, the data signal is recovered.

The phase $\theta_{OF}$ calculated by the frequency offset detecting unit 35 is provided also to the monitor control signal receiver 34 as described above. Here, the frequency offset is a difference between the frequency of the light source 11 of the transmitter 2 and that of the local oscillator 22 of the receiver 3. However, the oscillation frequency of the light source 11 changes in accordance with the monitor control signal in the first embodiment. Accordingly, the frequency offset detected by the receiver 3 also changes in accordance with the monitor control signal, as illustrated in FIG. 3B. In this embodiment, the detected frequency offset is "$f_C-f_{LO}$" or "$f_C-F_{LO}+\Delta f$" if the monitor control signal is "0" or "1".

The monitor control signal receiver 34 compares the detected frequency offset (phase $\theta_{OF}$) with a predetermined frequency offset threshold value. The frequency offset threshold value is set to detect a frequency fluctuation $\Delta f$ according to the monitor control signal. As a result, the monitor control signal receiver 34 can decide the value of each symbol of the monitor control signal on the basis of the frequency offset. Namely, the monitor control signal receiver 34 recovers the monitor control signal on the basis of the frequency offset.

In the optical communication system 1 according to the embodiments, the monitor control signal may be encoded to easily decide each symbol of the monitor control signal. Encoding of the monitor control signal is implemented, for example, by providing a transmission preprocessing unit 13 and a reception preprocessing unit 37 respectively in the transmitter 2 and the receiver 3. In this embodiment, the monitor control signal is transmitted by using a differential code. In this case, the transmission preprocessing unit 13 includes an exclusive OR circuit as illustrated in FIG. 6A, and outputs the result of an exclusive OR operation performed between an input symbol and an output symbol. Then, the monitor control signal encoded by the transmission preprocessing unit 13 is provided to the light source 11. Namely, the carrier frequency of the optical signal is controlled in accordance with the encoded monitor control signal.

In the receiver 3, the phase $\theta_{OF}$ corresponding to the frequency offset is provided to the monitor control signal receiver 34 after being decoded by the reception preprocessing unit 37. The reception preprocessing unit 37 includes a delay element and a subtractor as illustrated in FIG. 6B, and calculates a difference between symbols. Namely, differential decoding is performed. The delay time of the delay element included in the reception preprocessing unit 37 is the time period of one symbol of the monitor control signal.

In this case, the monitor control signal receiver 34 compares the decoding result (or the absolute value of the decoding result) obtained by the reception preprocessing unit 37 with a frequency offset threshold value. The frequency offset threshold value is, for example, the amount of phase equivalent to $\Delta f/2$. For example, if the decoding result is larger than the threshold value in this comparison operation, the monitor control signal is decided to be "1". If the decoding result is smaller than the threshold value, the monitor control signal is decided to be "0".

Figure 7:
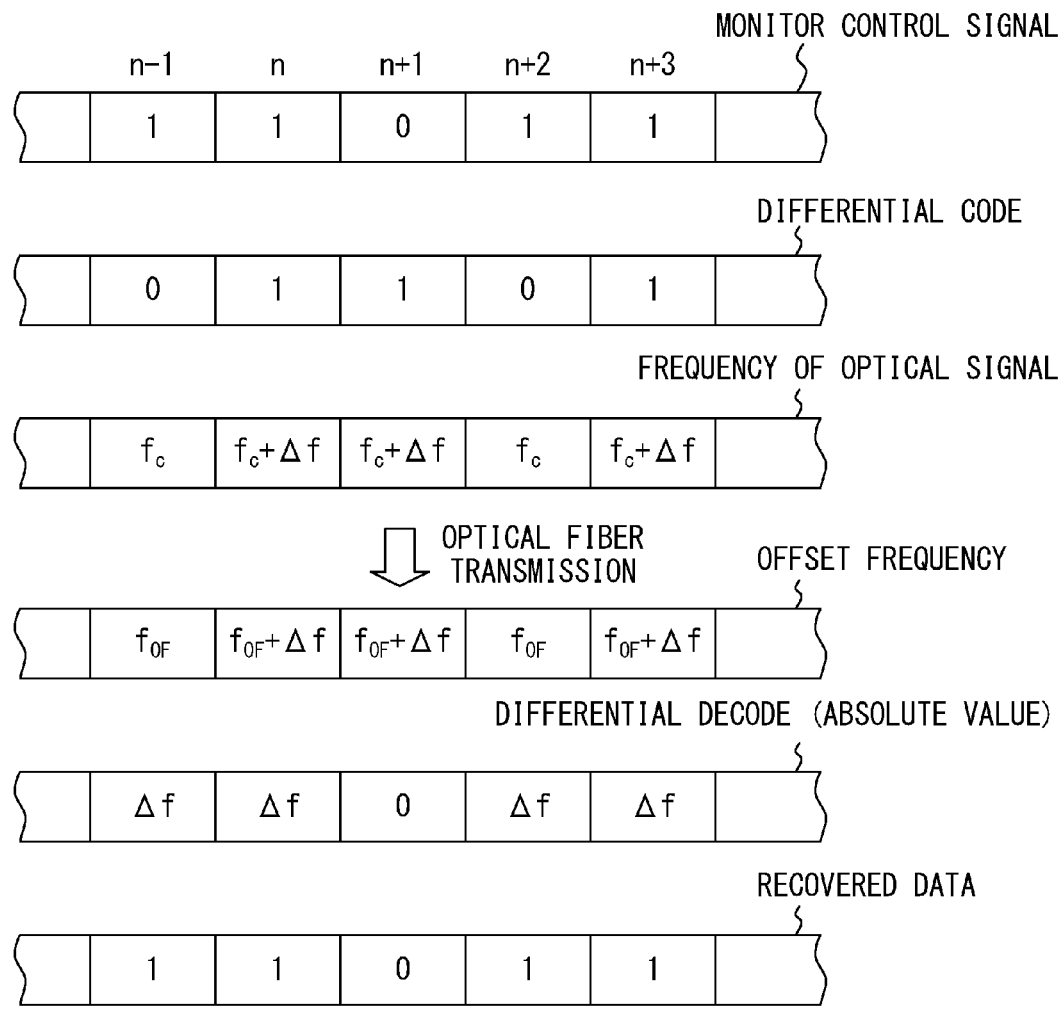
FIG. 7 is an explanatory view of the transmission and the detection of the monitor control signal.

FIG. 7 is an explanatory view of the transmission and the detection of the monitor control signal. Here, assume that the nth to (n+3)th symbols of the monitor control signal are 1, 0, 1 and 1, respectively. This monitor control signal is encoded by the transmission preprocessing unit 13. For example, the nth output symbol is obtained with an exclusive OR operation performed between the (n−1)th output symbol and the nth input symbol. In the example illustrated in FIG. 7, the (n−1)th output symbol is 0. Then, the nth output symbol is 1. Subsequent symbols are encoded in a similar manner. As a result, 1, 1, 0 and 1 are obtained as the encoded monitor control signal.

The encoded monitor control signal is provided to the light source 11. The oscillation frequency of the light source 11 changes in accordance with the encoded monitor control signal. Accordingly, the carrier frequency of the optical signal results in "$f_C+\Delta f$", "$f_C+\Delta f$", "$f_C$" and "$f_C+\Delta f$" in accordance with the nth to the (n+3)th symbols. This optical signal is transmitted via the optical transmission line, and received by the receiver 3.

The receiver 3 detects the frequency offset $f_{OF}$. Here, assume $f_{OF}=f_C-f_{LO}$. In this case, frequency offsets that are obtained by the receiver 3 and correspond to the nth to the (n+3)th symbols are "$f_{OF}+\Delta f$", "$f_{OF}+\Delta f$", "$f_{OF}$", and "$f_{OF}+\Delta f$". In the embodiment illustrated in FIG. 2, the frequency offsets are obtained as phase information.

The reception preprocessing unit 37 performs differential decoding on the data stream of the frequency offsets. Namely, for example, the nth output symbol is obtained with a difference between the (n−1)th input symbol and the nth input symbol. Therefore, the nth output symbol is "Δf". Subsequent symbols are decoded in a similar manner. As a result, "Δf", "0", "Δf" and "Δf" are obtained as the results of decoding performed by the reception preprocessing unit 37. Then, the monitor control signal receiver 34 obtains the recovered data "1", "0", "1" and "1" by comparing decoding results with the frequency offset threshold value (such as Δf/2). Namely, the monitor control signal is recovered.

As described above, in the optical communication system 1 according to the first embodiment, the monitor control signal superimposed on the data signal is transmitted by modulating the carrier frequency of the optical signal. The receiver 3 detects the frequency offsets, and recovers the monitor control signal on the basis of the frequency offset information. At this time, the frequency offset information is also used to recover the data signal by modulating the optical signal. Namely, in the receiver 3 according to this embodiment, the monitor control signal is recovered by using information for suitably demodulating the optical signal (information for recovering the data signal). Accordingly, operations dedicated to receiving the monitor control signal are reduced.

In the above described embodiment, the carrier frequency of the optical signal is modulated in accordance with the monitor control signal. However, this embodiment is not limited to this configuration. For example, a sub-carrier wave of several kHz to several MHz may be generated in the transmitter, and the generated sub-carrier wave may be modulated with the monitor control signal. In this case, the receiver can recover the monitor control signal, for example, with synchronous detection.

Figure 8:
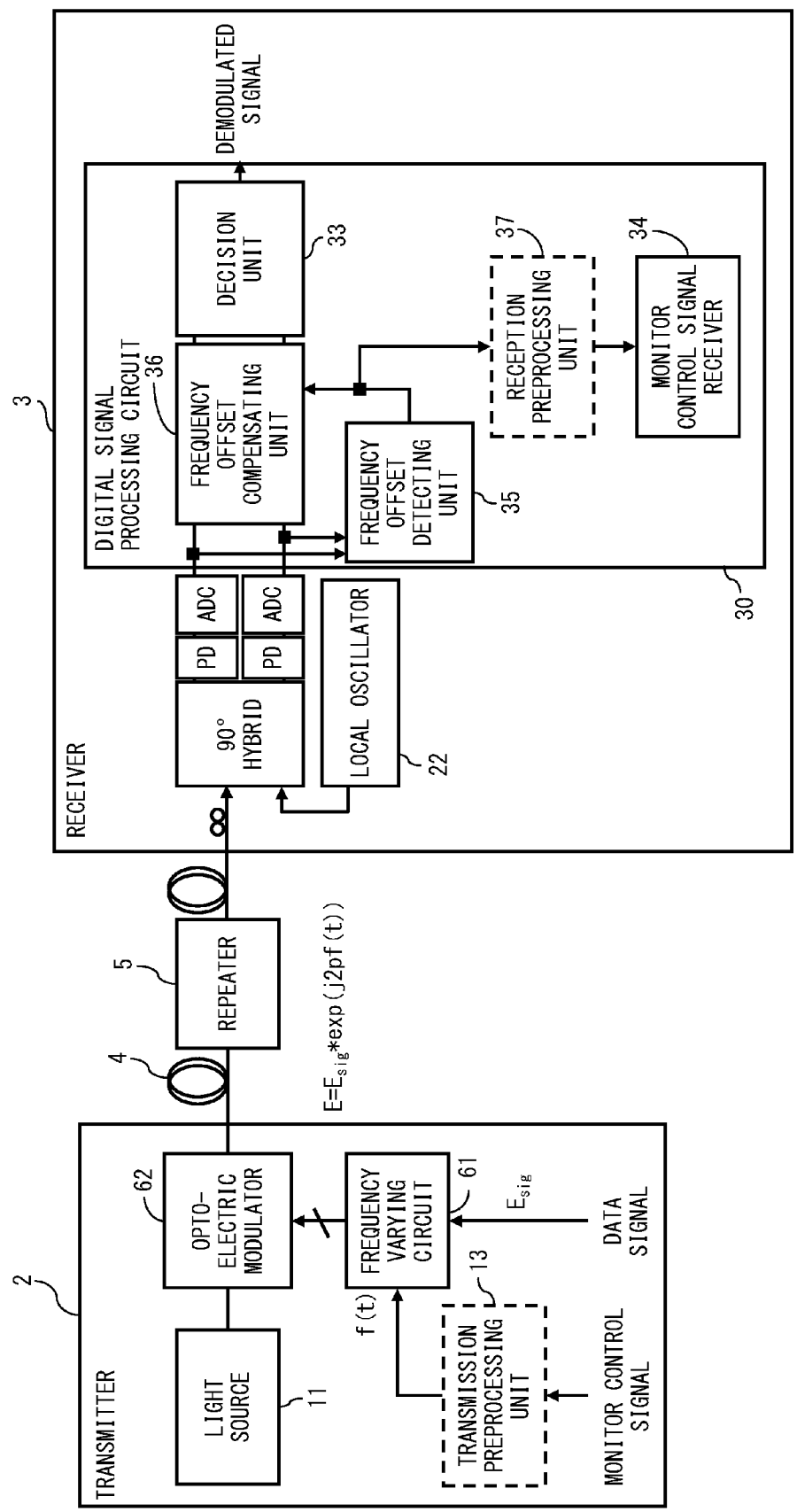
FIG. 8 illustrates a modification example of the first embodiment.

FIG. 8 illustrates a modification example of the first embodiment. In the example illustrated in FIG. 8, a method for generating an optical signal is different from that of the optical communication system illustrated in FIG. 2. Namely, the transmitter 2 illustrated in FIG. 8 includes a frequency varying circuit 61 and an opto-electric modulator 62. A data signal $E_{sig}$ is a data signal after being modulated with a desired modulation method (ASK, M-PSK, FSK, OFDM, etc.) in an electrical domain. Assume that the monitor control signal is represented as "f(t)".

The frequency varying circuit 61 changes the frequency of the data signal $E_{sig}$ in accordance with the value (0 or 1) of each symbol of the monitor control signal f(t). Namely, an output signal E of the frequency varying circuit 61 is represented by the equation $$E=E_{sig}\exp(j2\pi f(t))$$

The opto-electric modulator 62 modulates the optical signal (for example, continuous wave light) output from the light source 11 in accordance with the signal E. Specifically, the opto-electric modulator 62 modulates the input optical signal so that the electric field of the output optical signal becomes the signal E. As a result, substantially the same optical signal as the transmitter 2 illustrated in FIG. 2 is generated. Namely, the optical signal that transmits the data signal on which the monitor control signal is superimposed is generated. The opto-electric modulator 62 is sometimes called a vector modulator.

The configuration and the operations of the receiver 3 are as described with reference to FIGS. 2 to 7. Namely, the receiver 3 detects a fluctuation in the carrier frequency caused by the monitor control signal, and recovers the monitor control signal from the detection result. Also, in the configuration illustrated in FIG. 8, the transmission preprocessing unit 13 and the reception preprocessing unit 37 are not always required to be provided.

Second Embodiment

Figure 9:
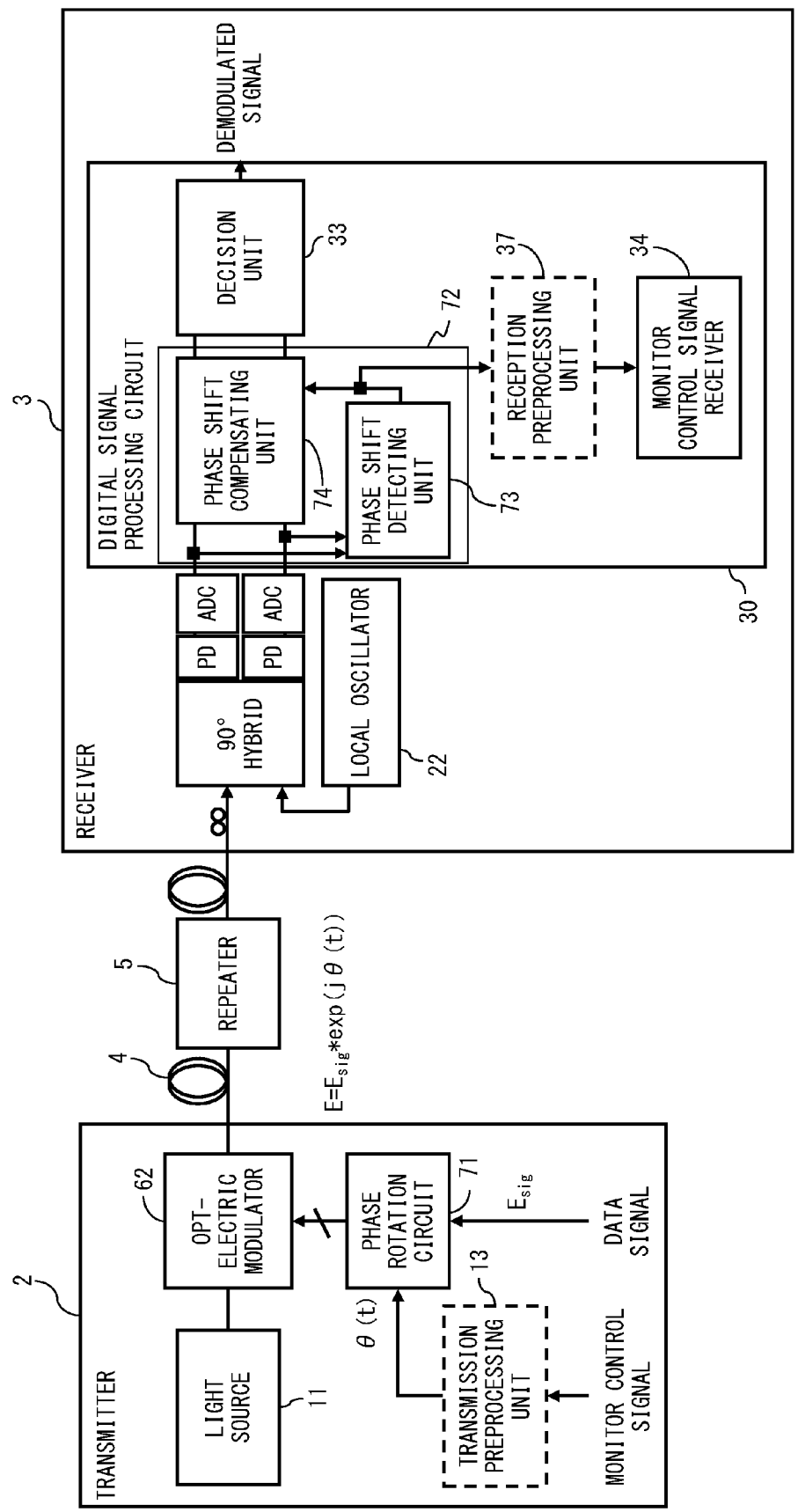
FIG. 9 illustrates a configuration of an optical communication system according to a second embodiment.

FIG. 9 illustrates a configuration of an optical communication system according to a second embodiment. In the second embodiment, the monitor control signal is transmitted by using the carrier phase of an optical signal.

In FIG. 9, the transmitter 2 includes the light source 11, the transmission preprocessing unit 13, the opto-electric modulator 62, and a phase rotation circuit 71. The light source 11 generates an optical signal (for example, continuous wave light) of a frequency $f_C$. The transmission preprocessing unit 13 performs differential encoding on the monitor control signal. The monitor control signal encoded by the transmission preprocessing unit 13 is hereinafter referred to as a monitor control signal θ(t). Moreover, the data signal $E_{sig}$ is a data signal after being modulated with a desired modulation method (ASK, M-PSK, FSK, OFDM, etc.) in an electrical domain.

The phase rotation circuit 71 changes the phase of the data signal $E_{sig}$ in accordance with the value (0 or 1) of each symbol of the monitor control signal θ(t). Namely, the output signal E of the phase rotation circuit 71 is represented by the equation $$E=E_{sig}\exp(j\theta(t))$$

The opto-electric modulator 62 modulates the optical signal (such as continuous wave light) output from the light source 11 in accordance with the signal E. Specifically, the optical signal is modulated so that the electric field of the optical signal becomes the signal E. In this way, the carrier phase of the optical signal is controlled in accordance with the value of each symbol of the monitor control signal. Namely, the monitor control signal is transmitted by using the carrier phase of the optical signal.

The receiver 3 includes the front-end circuit 20 and the digital signal processing circuit 30 in a similar manner as in the first embodiment. The digital signal processing circuit 30 in the second embodiment includes the decision unit 33, the monitor control signal receiver 34, the reception preprocessing unit 37, and a phase synchronization circuit 72. The phase synchronization circuit 72 includes a phase shift detecting unit 73 and a phase shift compensating unit 74. The digital signal processing circuit 30 in the second embodiment is assumed to include the frequency offset detecting unit 35 and the frequency offset compensating unit 36, which are illustrated in FIG. 2 or 8, although they are omitted in FIG. 9. Namely, the digital signal that represents the optical signal, the frequency offset of which is compensated for, is input into the phase synchronization circuit 72.

Figure 10:
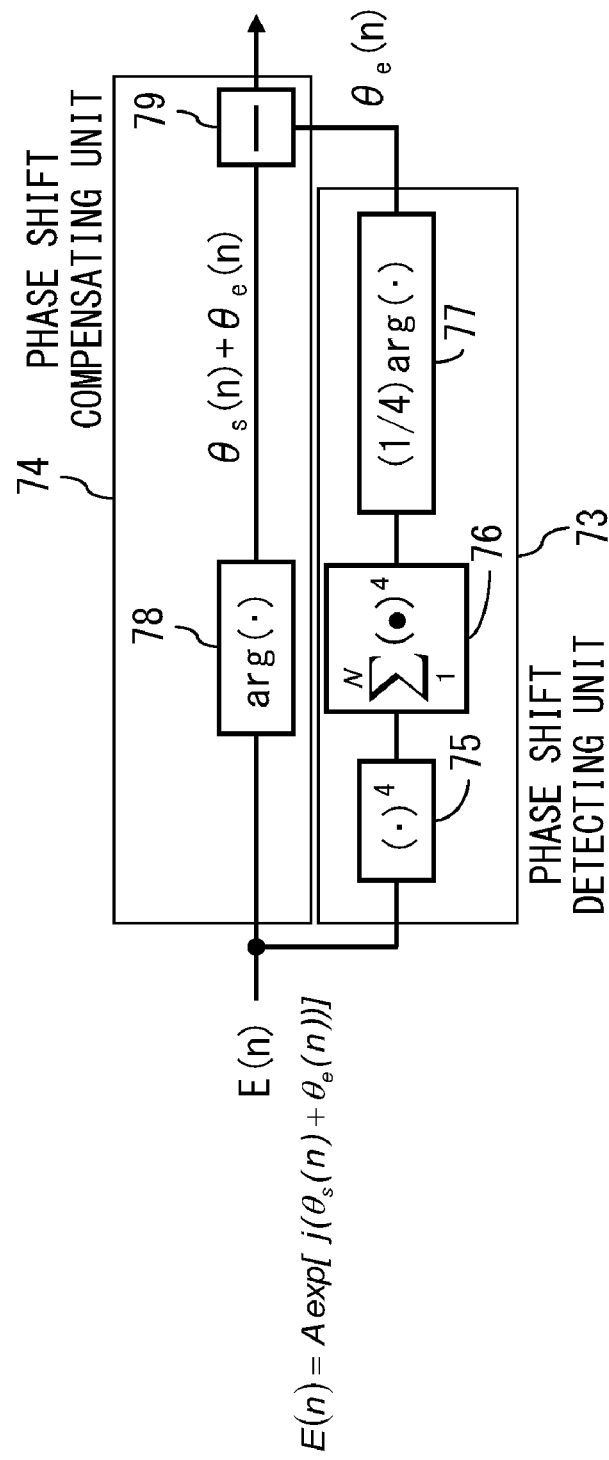
FIG. 10 illustrates an implementation example of a phase synchronization circuit.

FIG. 10 illustrates an implementation example of the phase synchronization circuit 72. Here, assume that the modulation method of the data signal is QPSK. A complex digital signal E (n) that is input into the phase synchronization circuit 72 represents the nth symbol of the data signal, and is provided by the equation $$E(n)=A\exp[j(\theta_S(n)+\theta_e(n))]$$

where "$\theta_S(n)$" is equivalent to a phase by the nth symbol of the data signal, and "$\theta_e(n)$" represents an error between the carrier phase and the phase of locally oscillated light.

The phase shift detecting unit 73 includes a multiplier 75, a total sum computing unit 76, and an argument calculating unit 77. Since the modulation method is QPSK, the multiplier 75 raises the signal E(n) to the fourth power. The total sum computing unit 76 calculates the total sum of the N sets of output values of the multiplier 75. Namely, an average value of N symbols is calculated. N is, for example, approximately 10 to 30, although N is not particularly limited. By averaging the N symbols, a noise component is removed. The argument calculating unit 77 calculates the argument of the complex number obtained by the total sum computing unit 76, and multiples the argument by "¼". As a result of this computation, a phase error $\theta_e(n)$, from which the phase component by the data signal is removed and which represents an error between the carrier phase and the phase of locally oscillated light, is obtained.

The phase shift compensating unit 74 includes an argument calculating unit 78 and a subtractor 79. The argument calculating unit 78 calculates the argument of the signal E(n) that is a complex number. Namely, "$\theta_S(n)+\theta_e(n)$" is calculated. Then, the subtractor 79 subtracts the phase error $\theta_e(n)$ obtained by the phase shift detecting unit 73 from the argument of the signal, which is obtained by the argument calculating unit 78. As a result of this computation, the signal phase from which the phase shift is removed can be obtained. Namely, the phase $\theta_S(n)$ is obtained.

The calculated phase $\theta_S(n)$ is transmitted to the decision unit 33. The decision unit 33 decides data on the basis of the phase $\theta_S(n)$. In QPSK, 2-bit data is obtained from the phase $\theta_S(n)$. Namely, the input optical signal is demodulated to recover the data signal.

In the meantime, the phase error $\theta_e(n)$ obtained by the phase shift detecting unit 73 is transmitted not only to the phase shift compensating unit 74 but also to the monitor control signal receiver 34. The phase error $\theta_e(n)$ is the difference between the carrier phase and the phase of locally oscillated light as described above. Here, the carrier phase is modulated with the signal E(n) in the transmitter 2. For example, if the modulation method of the data signal is phase modulation, the carrier phase depends on both the data signal and the monitor control signal. However, the phase component by the data signal is removed by the phase shift detecting unit 73. Accordingly, the phase error $\theta_e(n)$ changes in accordance with the monitor control signal superimposed in the transmitter 2. In this embodiment, the phase error $\theta_e(n)$ is, for example, "$\theta_0$" or "$\theta_0+\Delta\theta$" if the monitor control signal is "0" or "1".

In this embodiment, the phase error $\theta_e(n)$ is transmitted to the monitor control signal receiver 34 after being decoded by the reception preprocessing unit 37. The configuration and the operations of the reception preprocessing unit 37 are as described with reference to FIG. 6B. Accordingly, a difference in the phase error $\theta_e(n)$ between symbols is sequentially obtained by the reception preprocessing unit 37 in the second embodiment.

The monitor control signal receiver 34 compares the decoding result (or the absolute value of the decoding result) with a phase error threshold value. The phase error threshold value is, for example, $\Delta\theta/2$. To give an example using this value, if the decoding result is larger than the threshold value in this comparison operation, the monitor control signal is decides to be "1". If the decoding result is smaller than the threshold value, the monitor control signal is decided to be "0". In this way, the monitor control signal is recovered.

As described above, the monitor control signal superimposed on the data signal is transmitted by modulating the carrier phase of the optical signal in the optical communication system according to the second embodiment. Then, the receiver 3 detects a phase error between the carrier phase and the phase of locally oscillated light, and recovers the monitor control signal on the basis of phase error information that represents the phase error. At this time, the phase error information is also used to recover the data signal by demodulating the optical signal. Namely, the monitor control signal is recovered by using the information for suitably demodulating the optical signal (information for recovering the data signal) also in the second embodiment. Accordingly, operations dedicated to receiving the monitor control signal are reduced.

Also in the second embodiment, the transmission preprocessing unit 13 and the reception preprocessing unit 37 are not always required to be provided. Moreover, the carrier phase of the optical signal is modulated in accordance with the monitor control signal in the embodiment illustrated in FIG. 9. However, the embodiment is not limited to this configuration. For example, a sub-carrier wave of several kHz to several MHz may be generated in the transmitter, and the generated sub-carrier wave may be modulated with the monitor control signal. In this case, the receiver can recover the monitor control signal, for example with synchronous detection.

Third Embodiment

Figure 11:
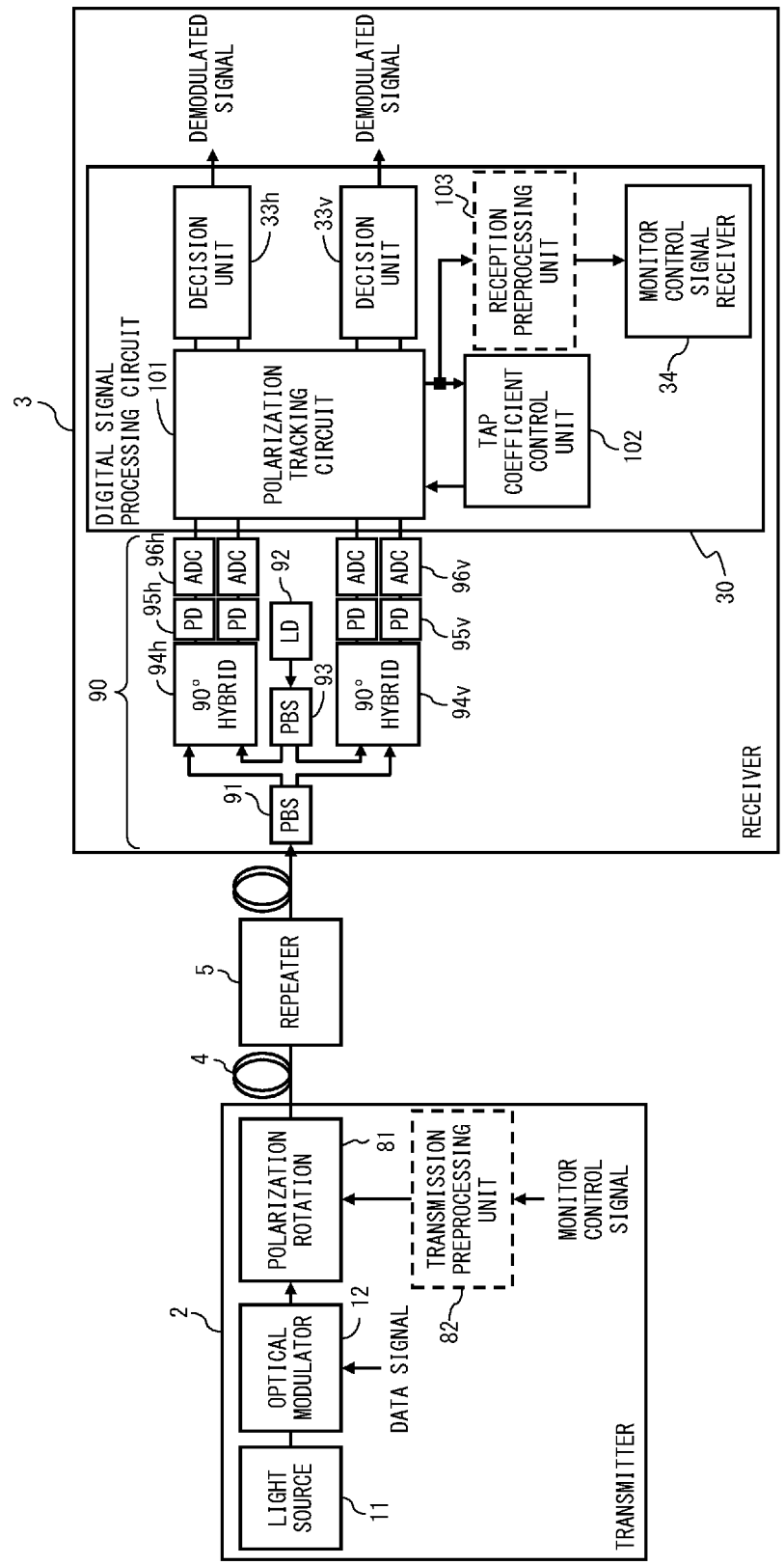
FIG. 11 illustrates a configuration of an optical communication system according to a third embodiment.

FIG. 11 illustrates a configuration of an optical communication system according to a third embodiment. In the third embodiment, the monitor control signal is transmitted by using the polarization state of the optical signal.

The transmitter 2 includes the light source 11, the optical modulator 12, and a polarization rotation circuit 81. The polarization rotation circuit 81 is, for example, a polarization controller. The polarization rotation circuit 81 controls the direction or state of the polarization of the optical signal output from the optical modulator 12 in accordance with the monitor control signal. As a result, the monitor control signal is superimposed on the data signal, and the optical signal that transmits the data signal and the monitor control signal is generated.

The receiver 3 is a polarization diversity receiver, and includes a front-end circuit 90. In the front-end circuit 90, a polarization beam splitter (PBS) 91 splits the input optical signal into a pair of polarized waves (horizontal (h)-polarized wave and vertical (v)-polarized wave), and guides the polarized waves to the 90° hybrid circuits 94h and 94v. A locally oscillated light source (LD) 92 generates locally oscillated light of almost the same frequency as the light source 11. A polarization beam splitter (PBS) 93 splits the locally oscillated light into a pair of polarized waves (h-polarized wave and v-polarized wave), and guides the polarized waves to the 90° hybrid circuits 94h and 94v. A pair of photodetectors 95h and a pair of A/D converters 96h are provided at output side of the 90° hybrid circuit 94h, whereas a pair of photodetectors 95v and a pair of A/D converters 96v are provided at output side of the 90° hybrid circuit 94v. Configurations and operations of the 90° hybrid circuits (94h, 94v), the photodetectors (95h, 95v), and the A/D converters 96 (96h, 96v) are similar to the 90° hybrid circuit 23, the photodetectors 24, and the A/D converters 25, which are illustrated in FIG. 1. Accordingly, the front-end circuit 90 generates a digital signal that represents the h-polarized wave of the input optical signal, and a digital signal that represents the v-polarized wave of the input optical signal.

The digital signal processing circuit 30 includes a polarization tracking circuit 101, a tap coefficient control unit 102, decision units 33h and 33v, and the monitor control signal receiver 34. The polarization tracking circuit 101 is a digital filter (such as a butterfly FIR filter), and adaptively controls an input optical signal in order to track fluctuations in the polarization of the input optical signal. The tap coefficient control unit 102 generates a tap coefficient (filter coefficient) optimum for tracking the polarization by the polarization tracking circuit 101. The decision units 33h and 33v respectively decide an h-polarized signal and a v-polarized signal, which are obtained by the polarization tracking circuit 101. As a result, one pair of demodulated signals is obtained. One pair of the demodulated signals is mixed, for example, by a mixer circuit not illustrated. Alternatively, a demodulated signal of a higher quality may be selected from the one pair of demodulated signals.

The tap coefficient generated by the tap coefficient control unit 102 converges to an almost constant value when the monitor control signal is not transmitted. However, in the third embodiment, the polarization of the optical signal rotates in accordance with the monitor control signal. Accordingly, the tap coefficient for tracking the polarization of the optical signal in the receiver 3 adaptively changes in accordance with the monitor control signal. The monitor control signal receiver 34 recovers the monitor control signal on the basis of a change in the tap coefficient.

Figure 12:
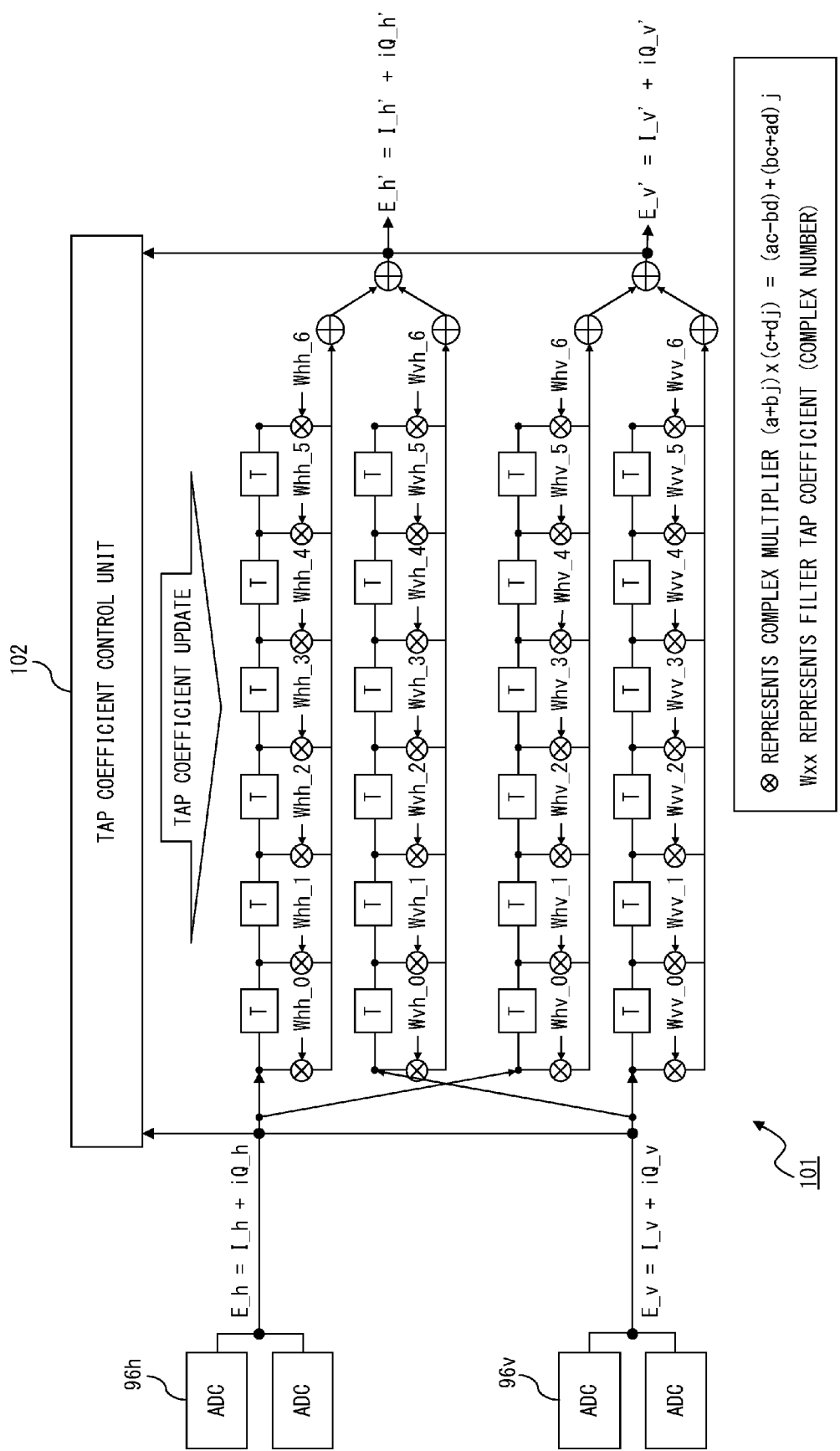
FIG. 12 illustrates an implementation example of a polarization tracking circuit.

FIG. 12 illustrates an implementation example of the polarization tracking circuit 101. The polarization tracking circuit 101 includes four FIR filters (hh filter, vh filter, hv filter and vv filter). A complex digital signal Eh that represents the h-polarized wave of the input optical signal is provided to the hh filter and the hv filter. Moreover, a complex digital signal Ev that represents the v-polarized wave of the input optical signal is provided to the vh filter and the vv filter.

Configuration and operations of the FIR filters are similar to one another. Each of the FIR filters is configured to use 7 taps in the example illustrated in FIG. 12, and includes six delay elements Ts, seven complex multipliers, and an adder. The six delay elements Ts are connected in series, and respectively delay an input signal. The delay time of each of the delay elements Ts is equivalent to the symbol time of a data signal. Accordingly, a complex digital signal of seven symbols is obtained with the six delay elements Ts. To the seven complex multipliers, tap coefficients generated by the tap coefficient control unit 102 are provided. For example, tap coefficients Whh_0 to Whh_6 are provided to the hh filter. Then, the input digital signal is multiplied by each of the tap coefficients. The adder adds up the multiplication results of the complex multipliers.

The output values of the hh filter and the hv filter are added by an adder, and output as a complex digital signal Eh'. Similarly, the output values of the vh filter and the vv filter are added by an adder, and output as a complex digital signal Ev'. The complex digital signals Eh' and Ev' are respectively transmitted to the decision units 33h and 33v.

The tap coefficient control unit 102 adaptively calculates a tap coefficient while monitoring the output signal of the polarization tracking circuit 101. A method for calculating a tap coefficient is, for example, the CMA (constant modulus algorithm), although the method is not particularly limited. With the CMA, a tap coefficient is calculated in accordance with the equation $$w(n+1)=w(n)-\mu r^*(n)|(y_n|^2-\gamma)y_n$$

where "W(n)" represents a tap coefficient of the nth symbol, "μ" represents a step size, "r(n)" represents an input signal to the polarization tracking circuit 101 and is equivalent to the complex digital signals Eh and Ev illustrated in FIG. 12, "$y_n$" represents the output signal of the polarization tracking circuit 101 and is equivalent to the complex digital signals Eh' and Ev' illustrated in FIG. 12, and "γ" represents a target value of the output signal of the polarization tracking circuit 101. As described above, a tap coefficient is updated by using a steepest descent method.

A thus calculated tap coefficient is provided to the polarization tracking circuit 101, and also transmitted to the monitor control signal receiver 34. The polarization tracking circuit 101 controls the tracking of the polarization of the input optical signal in accordance with the tap coefficients. In the meantime, the monitor control signal receiver 34 recovers the monitor control signal on the basis of the tap coefficients.

In the third embodiment, the monitor control signal may be transmitted by using a sub-carrier wave. In this case, the transmitter 2 includes the transmission preprocessing unit 82, whereas the receiver 3 includes the reception preprocessing unit 103.

Figure 13A:
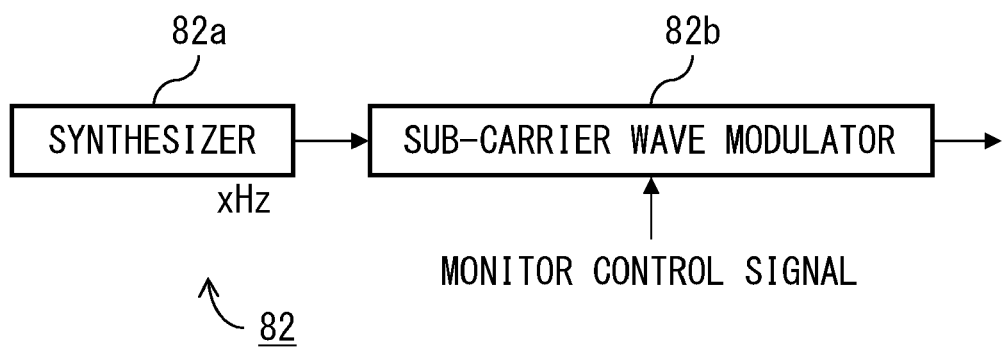
FIGS. 13A and 13B respectively illustrate an implementation example of a preprocessing unit using a sub-carrier wave.
Figure 13B:
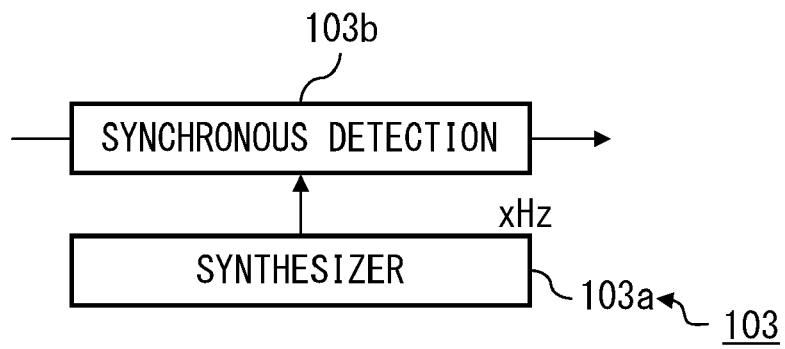

The transmission preprocessing unit 82 includes a synthesizer 82a and a sub-carrier wave modulator 82b as illustrated in FIG. 13A. The synthesizer 82a generates a sub-carrier wave. The frequency of the sub-carrier wave is assumed to be, for example, a frequency sufficiently lower than the symbol rate of the data signal, although the frequency of the sub-carrier wave is not particularly limited. The sub-carrier wave modulator 82b modulates the sub-carrier wave in accordance with the monitor control signal. A modulation method is not particularly limited, however intensity modulation, frequency modulation, or phase modulation may be adopted.

The reception preprocessing unit 103 includes a synthesizer 103a and a synchronous detection circuit 103. The synthesizer 103a generates a sub-carrier wave of the same frequency as the synthesizer 82a. The synchronous detection circuit 103b detects a received signal by using the sub-carrier wave generated by the synthesizer 103a. With this detection, the modulation components (signals representing an intensity, a frequency and a phase) of the monitor control signal is obtained.

As described above, in the optical communication system 1 according to the third embodiment, the monitor control signal superimposed on the data signal is transmitted by using the polarization state of the optical signal. The receiver 3 monitors the polarization state of the optical signal, and recovers the monitor control signal on the basis of tap coefficients for adaptively controlling polarization tracking. Namely, also in the third embodiment, the monitor control signal is recovered by using information for suitably demodulating an optical signal (information for recovering a data signal). Accordingly, the amount of processing dedicated to receiving the monitor control signal is reduced.

<Modification Example of the Front-End Circuit>

Also in the optical communication system according to the first and the second embodiments, polarization diversity reception may be made. In this case, the receiver 3 illustrated in FIG. 2, 8 or 9 includes the front-end circuit 90 illustrated in FIG. 11 as a replacement for the front-end circuit 20.

Figure 14:
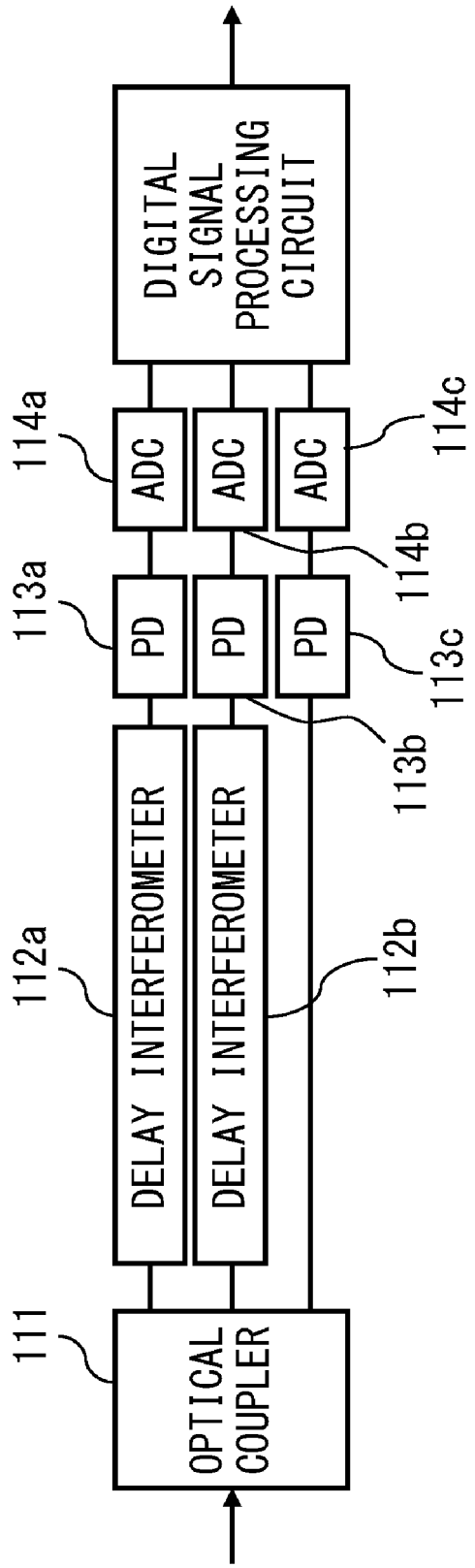
FIG. 14 illustrates a configuration of a self-coherent receiver.

The front-end circuit may be a self-coherent receiver. The self-coherent receiver includes an optical coupler 111, delay interferometers 112a, 112b, photodetectors 113a, 113b, 113c, and A/D converters 114a, 114b, 114c as illustrated in FIG. 14. The self-coherent receiver can detect an optical signal without locally oscillated light. The optical coupler 111 branches the input optical signal, and guides the branched signals to the delay interferometers 112a, 112b, and the photodetector 113c. The delay interferometer 112a is a 1-symbol delay interferometer, whereas the delay interferometer 112b is a 1-symbol delay interferometer having a π/2 phase shifter. The photodetectors 113a, 113b, 113c respectively convert an optical signal into an electric signal. The phase information of the I-component and that of the Q-component of the input optical signal are recovered by using these three signals in the digital signal processing circuit. Note that the self-coherent receiver may be used in the third embodiment.

<Bidirectional Communication>

Figure 15:
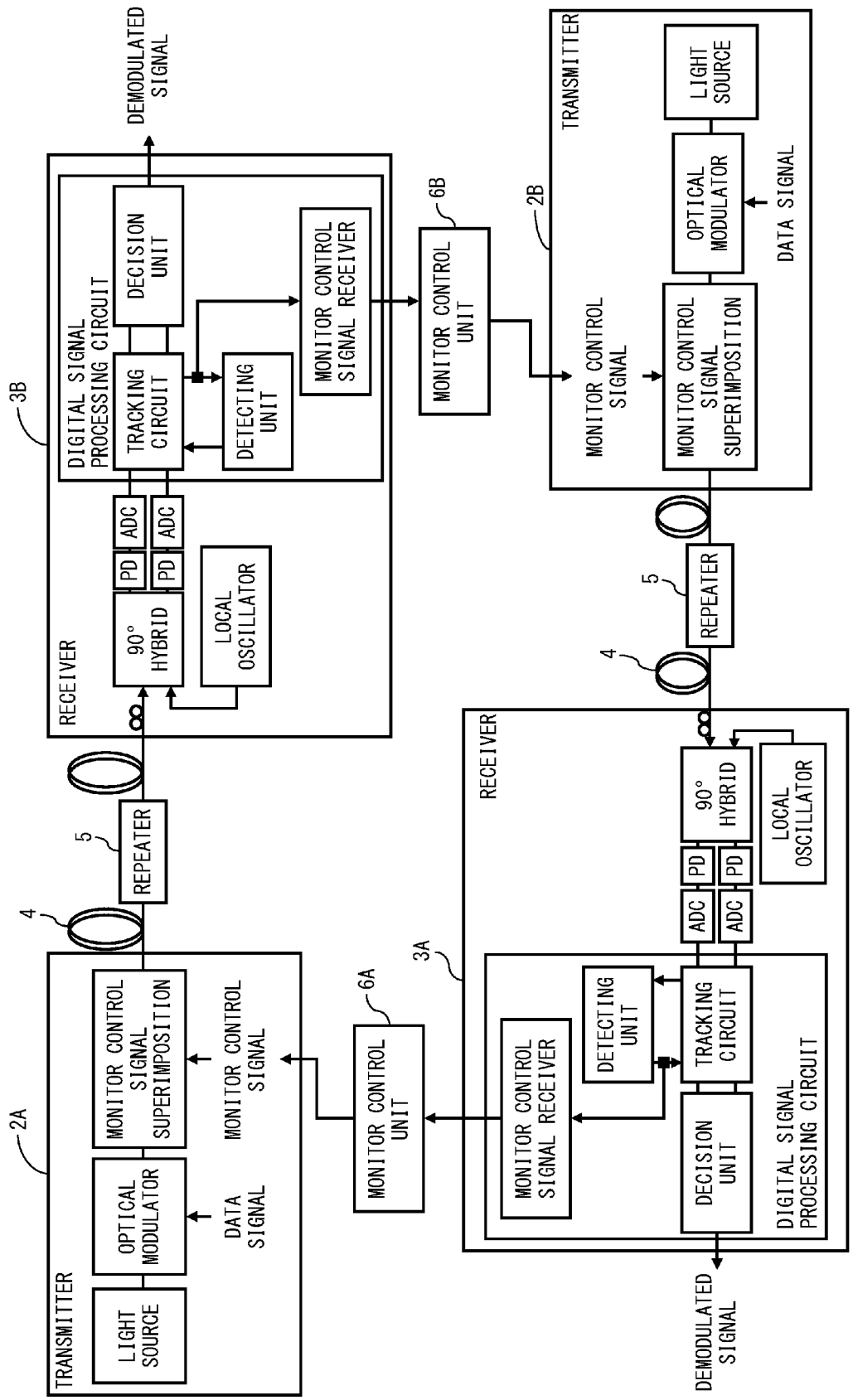
FIG. 15 illustrates a configuration of an optical communication system for making a bidirectional communication between a pair of communication devices.

FIG. 15 illustrates a configuration of an optical communication system that produces a bidirectional communication between a pair of communication devices. In FIG. 15, a communication device A includes a transmitter 2A, a receiver 3A, and a monitor control unit 6A. Similarly, a communication device B includes a transmitter 2B, a receiver 3B, and a monitor control unit 6B. The transmitters 2A and 2B are equivalent to the transmitter 2 in the first to the third embodiments, whereas the receivers 3A and 3B are equivalent to the receiver 3 in the first to the third embodiments.

The monitor control unit 6A generates a monitor control signal including, for example, information that represents the operating state of the communication device A, or information that represents the quality of a data signal received from the communication device B. Moreover, the monitor control unit 6A controls the operations of the communication device A on the basis of the monitor control signal transmitted from the communication device B. Operations of the monitor control unit 6B are similar to the monitor control unit 6A. With the above described configuration, the monitor control signal is transmitted/received between a pair of communication devices.

<Effects Produced by the Configurations of the Embodiments>

With the optical communication system and/or the receiver according to the embodiments, a cost-effective monitor control signal with a high performance can be transmitted.

Additionally, performance monitor data obtained by the receiver can be reported to the transmitter by using the monitor control signal. In this configuration, an optimum modulation method/bit rate can be selected in accordance with communication quality, thereby improving the use efficiency of the network.

Furthermore, by using the monitor control signal, the receiver can notify the transmitter of information representing whether or not a signal can be properly received. In this case, the transmitter can suitably change the contents of the header of the data signal to be transmitted to the receiver in accordance with the notification made from the receiver. Accordingly, the communication efficiency is improved. Alternatively, transmission performance is improved by changing the redundancy of an error correction code.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. An optical communication system for transmitting an optical signal via an optical transmission line, comprising:
   an optical signal generator configured to generate an optical signal that transmits a first data signal and a second data signal, in a transmitter;
   an optical front-end configured to generate a digital signal that represents the optical signal, in a receiver;
   a detector configured to detect a state of the optical signal by using the digital signal, and output state information that represents the state of the optical signal, in the receiver;
   a state controller configured to control the digital signal on the basis of the state information in order to recover the first data signal, in the receiver; and
   a data recovery configured to recover the second data signal on the basis of the state information, in the receiver, wherein
   the optical signal generator modulates a carrier frequency of the optical signal in accordance with the second data signal, and
   the data recovery recovers the second data signal by determining an amount of a fluctuation in the carrier frequency.

2. The optical communication system according to claim 1, wherein
   the optical front-end comprises a local oscillator for generating locally oscillated light intended to detect the optical signal,
   the detector detects, as the state information, a frequency offset between the carrier frequency of the optical signal and a frequency of the locally oscillated light,
   the state controller compensates for the frequency offset, and
   the data recovery recovers the second data signal on the basis of a fluctuation in the frequency offset.

3. The optical communication system according to claim 2, wherein
   the transmitter comprises an encoder for performing differential encoding on the second data signal,
   the optical signal generator controls the carrier frequency of the optical signal to be a first frequency or a second frequency in accordance with a value of each symbol of the encoded second data signal,
   the receiver comprises a decoder for performing differential decoding on the state information that represents the frequency offset, and
   the data recovery decides each symbol of the second data signal by comparing an output of the decoder with a threshold value.

4. The optical communication system according to claim 1, wherein
   the optical signal generator comprises a vector modulator for modulating continuous wave light by using a mixed signal of the first and the second data signals.

5. The optical communication system according to claim 1, wherein
   a symbol rate of the second data signal is lower than a symbol rate of the first data signal, and
   the second data signal is transmitted by the optical signal by being superimposed on the first data signal.

6. An optical communication system for transmitting an optical signal via an optical transmission line, comprising:
   an optical signal generator configured to generate an optical signal that transmits a first data signal and a second data signal, in a transmitter;
   an optical front-end configured to generate a digital signal that represents the optical signal, in a receiver;
   a detector configured to detect a state of the optical signal by using the digital signal, and output state information that represents the state of the optical signal, in the receiver;
   a state controller configured to control the digital signal on the basis of the state information in order to recover the first data signal, in the receiver; and a data recovery configured to recover the second data signal on the basis of the state information, in the receiver wherein the optical signal generator modulates a carrier phase of the optical signal in accordance with the second data signal, and the data recovery recovers the second data signal on the basis of a fluctuation in the carrier phase.

7. The optical communication system according to claim 6, wherein the optical front-end comprises a local oscillator for generating locally oscillated light intended to detect the optical signal, the detector detects, as the state information, a phase error between the carrier phase of the optical signal and a phase of the locally oscillated light, the state controller compensates for the phase error, and the data recovery recovers the second data signal on the basis of a fluctuation in the phase error.

8. An optical communication system for transmitting an optical signal via an optical transmission line, comprising:

an optical signal generator configured to generate an optical signal that transmits a first data signal and a second data signal, in a transmitter;

an optical front-end configured to generate a digital signal that represents the optical signal, in a receiver;

a detector configured to detect a state of the optical signal by using the digital signal, and output state information that represents the state of the optical signal, in the receiver;

a state controller configured to control the digital signal on the basis of the state information in order to recover the first data signal, in the receiver; and a data recovery configured to recover the second data signal on the basis of the state information, in the receiver wherein the optical signal generator controls a polarization of the optical signal in accordance with the second data signal, and the data recovery recovers the second data signal by determining an amount of a fluctuation in polarization state of the optical signal.

9. The optical communication system according to claim 8, wherein the receiver is a polarization diversity receiver that extracts first and second polarization components from the optical signal, and recovers the first data signal by using the first and the second polarization components, the state controller is a polarization tracking circuit for splitting the optical signal into orthogonal polarized waves by using a digital filter, the state information is a filter coefficient provided to the digital filter, and the data recovery recovers the second data signal on the basis of a fluctuation in the filter coefficient.

10. An optical receiver for receiving an optical signal that transmits a first data signal and a second data signal, comprising:

an optical front-end configured to generate a digital signal that represents the optical signal;

a detector configured to detect a state of the optical signal by using the digital signal, and output state information that represents the state of the optical signal;

a state controller configured to control the digital signal on the basis of the state information in order to recover the first data signal; and a data recovery configured to recover the second data signal on the basis of the state information, wherein a carrier frequency of the optical signal is modulated in accordance with the second data signal, and the data recovery recovers the second data signal by determining an amount of a fluctuation in the carrier frequency.

11. A digital signal processing circuit used in an optical receiver for receiving an optical signal that transmits a first data signal and a second data signal, comprising:

a detector configured to detect a state of the optical signal by using a digital signal that represents the optical signal, and output state information that represents the state of the optical signal;

a state controller configured to control the digital signal on the basis of the state information in order to recover the first data signal; and a data recovery configured to recover the second data signal on the basis of the state information, wherein a carrier frequency of the optical signal is modulated in accordance with the second data signal, and the data recovery recovers the second data signal by determining an amount of a fluctuation in the carrier frequency.

* * * * *